(12) United States Patent
Lin (10) Patent No.: US 12,287,834 B2
(45) Date of Patent: Apr. 29, 2025

(54) CITATION DOCUMENT UPDATES BASED ON ASSOCIATED DOCUMENT MODIFICATION

(71) Applicant: BEIJING BYTEDANCE NETWORK TECHNOLOGY CO., LTD., Beijing (CN)

(72) Inventor: Shihong Lin, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/004,869

(22) PCT Filed: Jul. 7, 2021

(86) PCT No.: PCT/CN2021/105037
§ 371 (c)(1),
(2) Date: Jan. 9, 2023

(87) PCT Pub. No.: WO2022/007855
PCT Pub. Date: Jan. 13, 2022

(65) Prior Publication Data
US 2023/0350872 A1 Nov. 2, 2023

(30) Foreign Application Priority Data
Jul. 9, 2020 (CN) .......................... 202010655848.3

(51) Int. Cl.
*G06F 16/901* (2019.01)
*G06F 16/907* (2019.01)

(52) U.S. Cl.
CPC .......... *G06F 16/907* (2019.01); *G06F 16/901* (2019.01)

(58) Field of Classification Search
None
See application file for complete search history.

(56) References Cited

U.S. PATENT DOCUMENTS

2007/0208707 A1* 9/2007 Okamoto .............. G06F 16/903
707/E17.135
2012/0151312 A1 6/2012 Clee et al.
(Continued)

FOREIGN PATENT DOCUMENTS

JP 2009223717 A 10/2009
JP 2017174319 A 9/2017
(Continued)

OTHER PUBLICATIONS

Ercegova, Vuk, et al., "Supporting Sub-Document Updates and Queries in an Inverted Index", ACM CIKM '08, Oct. 26-30, 2008, pp. 659-668. (Year: 2008).*
(Continued)

*Primary Examiner* — Scott A. Waldron (57) ABSTRACT

An updating method of a citation document, an apparatus, an electronic device and a storage medium. The method includes: acquiring a document relationship diagram of a database; acquiring a document modification instruction, where the document modification instruction includes a document identification and a document modification content; extracting an associated document identification from the document relationship diagram according to the document identification; pushing the document modification content to an associated document corresponding to the associated document identification.

14 Claims, 4 Drawing Sheets

(56) References Cited

U.S. PATENT DOCUMENTS

2018/0367597 A1 12/2018 Kolli
2019/0205417 A1 7/2019 Lai

FOREIGN PATENT DOCUMENTS

JP 2017224173 A 12/2017
WO 2019070687 A1 4/2019

OTHER PUBLICATIONS

Dohrn, Hannes & Dirk Riehle, "Fine-grained Change Detection in Structured Text Documents", ACM DocEng '14, Sep. 16-19, 2014, pp. 87-96. (Year: 2014).*
Extended European Search Report issued Oct. 9, 2023 in European Application No. 21838816.3 (10 pages).
Notice of Reasons for Refusal Jan. 23, 2024 issued in JP Appl. No. 2023-501413, English translation (8 pages).
Office action received from European patent application No. 21838816.3 mailed on Jun. 19, 2024, 6 pages.
Summons to Attend Oral Proceedings received from European patent application No. 21838816.3 maiied on Nov. 15, 2024, 8 pages.
Anonymous: "Queueing theory—Wikipedia", Jan. 6, 2020, XP093222314, Retried from Internet: URL:https://web.archive.org/web/20200106104752/https://en.wikipedia.org/wiki/Queueing_theory, 12 pages.

* cited by examiner

CITATION DOCUMENT UPDATES BASED ON ASSOCIATED DOCUMENT MODIFICATION

CROSS-REFERENCES TO RELATED APPLICATIONS

The present application is a National Stage of International Application No. PCT/CN2021/105037, filed on Jul. 7, 2021, which claims priority to Chinese patent application No. 202010655848.3, filed to China National Intellectual Property Administration on Jul. 9, 2020 and entitled "UPDATING METHOD OF CITATION DOCUMENT, APPARATUS, ELECTRONIC DEVICE AND STORAGE MEDIUM". The content of the above applications are hereby incorporated by reference in their entireties.

TECHNICAL FIELD

Embodiments of the present disclosure relate to the field of data processing technologies and, in particular, to an updating method of a citation document, an apparatus, an electronic device and a storage medium.

BACKGROUND

At present, there may be multiple shared documents inside an enterprise, and in order to save a storage space of a database, the documents may be stored by means of citing each other.

Although the documents can be stored by means of citing each other, due to a complex citing ability in the database, it is prone to ignore synchronous update or modification of some associated documents in a process of updating a document, which affects consistency of a document update content in the database.

SUMMARY

Embodiments of the present disclosure provides an updating method of a citation document, an apparatus, an electronic device and a storage medium to realize synchronous update of documents with a citation relationship.

In a first aspect, an embodiment of the present disclosure provides an updating method of a citation document, including:
  acquiring a document relationship diagram of a database, where the document relationship diagram includes nodes and a connection line, each node represents a document identification, and each connection line represents a document citation relationship;
  acquiring a document modification instruction, where the document modification instruction includes a document identification and a document modification content;
  extracting an associated document identification from the document relationship diagram according to the document identification; and
  pushing the document modification content to an associated document corresponding to the associated document identification.

In a second aspect, an embodiment of the present disclosure further provides an updating apparatus of a citation document, including:
  a document relationship diagram acquisition module, configured to acquire a document relationship diagram of a database, where the document relationship diagram includes nodes and a connection line, each node represents a document identification, and each connection line represents a document citation relationship;
  a document modification instruction acquisition module, configured to acquire a document modification instruction, where the document modification instruction includes a document identification and a document modification content;
  an associated document identification extraction module, configured to extract an associated document identification from the document relationship diagram according to the document identification; and
  a document modification content pushing module, configured to push the document modification content to an associated document corresponding to the associated document identification.

In a third aspect, an embodiment of the present disclosure further provides an electronic device, including:
  one or more processors;
  a storage apparatus, configured to store one or more programs,
  the one or more processors implement the method according to any embodiment of the present disclosure when the one or more programs are executed by the one or more processors.

In a fourth aspect, an embodiment of the present disclosure provides a computer-readable storage medium having a computer program stored thereon, where the method according to any embodiment of the present disclosure is implemented when the program is executed by a processor.

In a fifth aspect, an embodiment of the present disclosure provides a computer program product including a computer program, where steps of the method according to the first aspect of the present disclosure are implemented when the computer program is executed by a processing apparatus.

In a sixth aspect, an embodiment of the present disclosure provides a computer program, where steps of the method according to the first aspect of the present disclosure are implemented when the computer program is executed by a processing apparatus.

In the embodiments of the present disclosure, the document relationship diagram of the database and the document modification instruction are acquired; the associated document identification is extracted from the document relationship diagram according to the document identification included in the document modification instruction; and the document modification content included in the document modification instruction is pushed to the associated document corresponding to the associated document identification. In this way, when a content of a document is edited and updated, a citation document associated with the edited document can also be updated synchronously, thereby ensuring consistency of the document update content in the database.

BRIEF DESCRIPTION OF THE DRAWINGS

In combination with accompanying drawings and with reference to the following description of embodiments, the above and other features, advantages and aspects of embodiments of the present disclosure will become more apparent. Throughout the drawings, a same or similar reference sign represents a same or similar element. It should be understood that the drawings are schematic and that an original and an element are not necessarily drawn to scale.

DESCRIPTION OF EMBODIMENTS

Embodiments of the present disclosure will be described in more detail below with reference to the accompanying drawings. Although some embodiments of the present disclosure are shown in the accompanying drawings, it should be understood that the present disclosure may be implemented in various forms and should not be construed as limited to the embodiments set forth herein; on the contrary, these embodiments are provided for a more thorough and complete understanding of the present disclosure. It should be understood that the drawings and embodiments of the present disclosure are only for exemplary purposes and are not intended to limit the protection scope of the present disclosure.

It should be understood that steps described in method implementations of the present disclosure may be performed in a different order and/or in parallel. Furthermore, the method implementations may include additional steps and/or omit performing illustrated steps. The scope of the present disclosure is not limited in this regard.

As used herein, the term "including" and its variations are open-ended inclusion, that is, "including but not limited to". The term "based on" is "based at least in part on". The term "an/one embodiment" means "at least one embodiment"; the term "another embodiment" means "at least one other embodiment"; the term "some embodiments" means "at least some embodiments". Relevant definitions of other terms will be given in the following description.

It should be noted that concepts such as "first" and "second" mentioned in the present disclosure are only used to distinguish different apparatuses, modules or units, and are not used to limit an order or interdependence of functions performed by these apparatuses, modules or units.

It should be noted that modifications of "one" and "multiple" mentioned in the present disclosure are schematic rather than restrictive, and those skilled in the art should understand that they should be understood as "one or multiple" unless otherwise clearly indicated in the context.

The names of messages or information interacted between multiple apparatuses in the implementations of the present disclosure are for illustrative purposes only, and are not intended to limit the scope of these messages or information.

Embodiment 1

Figure 1A:
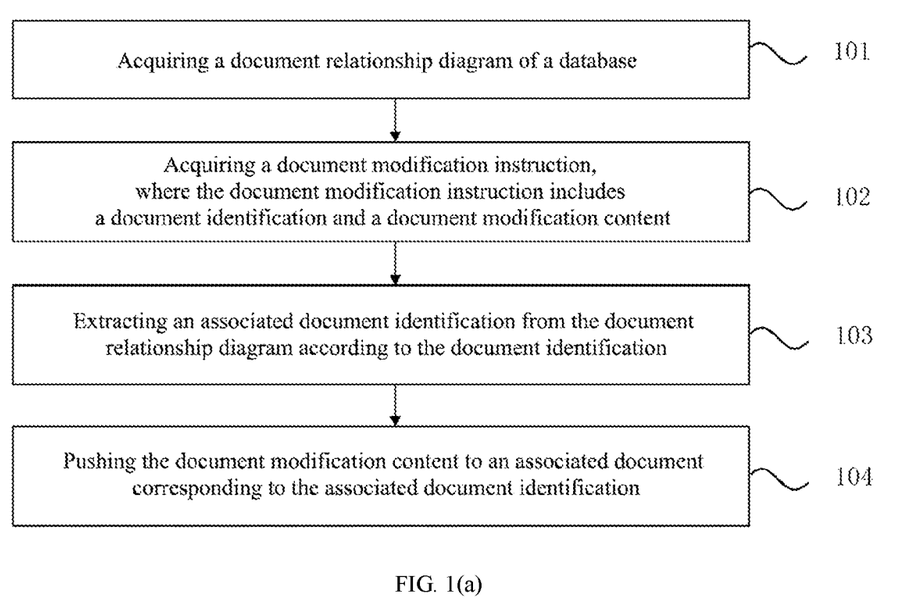
FIG. 1(a) is a flowchart of an updating method of a citation document provided in Embodiment 1 of the present disclosure.

FIG. 1(a) is a flowchart of an updating method of a citation document provided by an embodiment of the present disclosure. The embodiment may be applied to a case of synchronous update of documents with a citation relationship, and the method may be executed by an updating apparatus provided by embodiments of the present disclosure, which may be implemented in software and/or hardware, and may generally be integrated in a computer device.

As shown in FIG. 1(a), the method in the embodiment of the present disclosure may include the following steps.

Step 101, acquiring a document relationship diagram of a database.

The document relationship diagram includes nodes and a connection line, each node represents a document identification, and each connection line represents a document citation relationship.

Figure 1B:
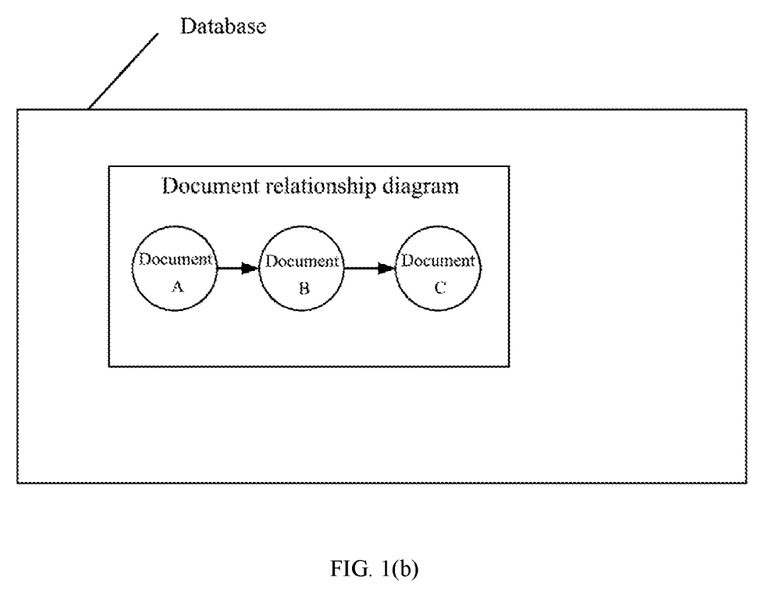
FIG. 1(b) is a schematic diagram of a document relationship diagram of a database provided in Embodiment 1 of the present disclosure.

A schematic diagram of a document relationship diagram of a database provided in Embodiment 1 of the present application is as shown in FIG. 1(b). The document relationship diagram is a directed acyclic diagram and includes three nodes, namely document A, document B and document C. Document A, document B and document C are connected sequentially. Therefore, document A cites document B directly, document B cites document C directly, and thus document A cites document C indirectly.

Figure 1C:
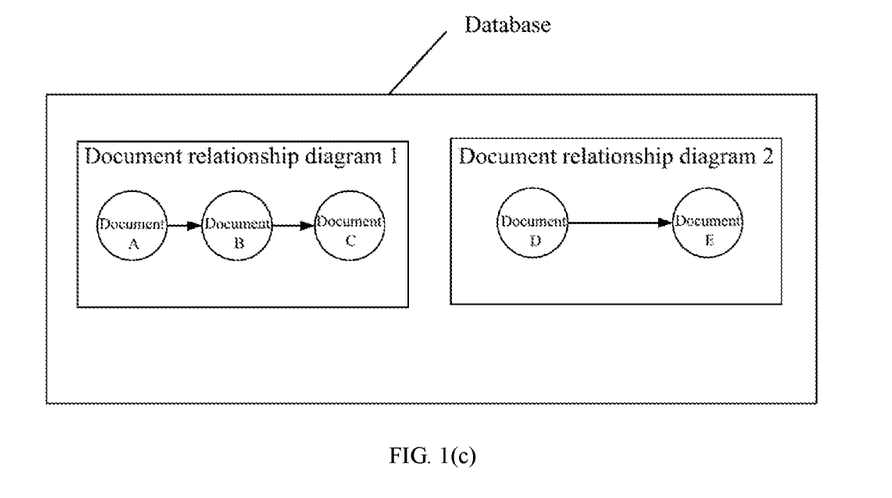
FIG. 1(c) is a schematic diagram of another document relationship diagram of a database provided in Embodiment 1 of the present disclosure.

It should be noted that the database in this implementation may also include multiple document relationship sub-diagrams, and nodes in each document relationship sub-diagram are not connected with each other. A schematic diagram of another document relationship diagram of a database is as shown in FIG. 1(c), where two document relationship sub-diagrams are included, namely, document relationship diagram 1 and document relationship diagram 2. Three nodes are included in the document relationship diagram 1, namely, document A, document B and document C, and there is a direct or indirect citation relationship between the three nodes. Two nodes are included in the document relationship diagram 2, namely, document D and document E, and there is a direct citation relationship between the two nodes. In addition, there is no connection line between the nodes in the document relationship diagram 1 and the nodes in the document relationship diagram 2, so there is no citation relationship between the nodes in the document relationship diagram 1 and the nodes in the document relationship diagram 2.

Step 102, acquiring a document modification instruction, where the document modification instruction includes a document identification and a document modification content.

In an implementation, the document modification content includes a change of a variable value or a change of a formula.

Specifically, in this implementation, when a user needs to perform an editing operation on a document in the database, the user can specifically input a document modification instruction to an electronic device where the database is located, and the inputting may be performed through a touch screen or a key on the electronic device. A terminal device will acquire the document modification instruction in response to the user's trigger operation.

The document modification instruction includes the document identification and the document modification content, and the document modification content includes the change of the variable value or the change of the formula. For example, the document modification instruction includes: modifying a variable value x=9 of document C to x=20. Of course, this implementation is only an example, and does not limit a specific form of the document modification instruction.

Step 103, extracting an associated document identification from the document relationship diagram according to the document identification.

In an implementation, extracting the associated document identification from the document relationship diagram according to the document identification may include: extracting a citation party list from the document relationship diagram according to the document identification; and acquiring the associated document identification having a citation relationship with the document identification from the citation party list.

In an implementation, extracting the citation party list from the document relationship diagram according to the document identification includes: acquiring a first type of document identification citing the document identification directly and a second type of document identification citing the document identification indirectly from the document relationship diagram; and constructing the citation party list according to the first type of document identification and the second type of document identification.

Specifically, in this implementation, after acquiring the document modification instruction, the document modification instruction including for example: modifying a variable value x=9 of document C to x=20, then the citation party list is extracted from the document relationship diagram, such as FIG. 1(b), according to a document identification "document C". A manner of extracting the citation party list is, acquiring the first type of document identification citing document C directly from the document relationship diagram, including document B, and the second type of document identification citing document C indirectly, including document A, and constructing the citation party list according to the first type of document identification and the second type of document identification. As shown in Table 1 is an example of the citation party list for document C:

TABLE 1

| Cited party | Citing party | Citation manner |
| --- | --- | --- |
| Document C | Document B | Direct citation |
| Document C | Document A | Indirect citation |

Therefore, when it is determined that document C is updated due to being edited, the associated document identification having the citation relationship with document C can be acquired from the citation party list constructed previously. For Table 1, the associated document identification includes document A and document B.

It should be noted that the associated document identification having the citation relationship with document C refers to all document identifications that cite document C directly or indirectly by taking document C as the cited party.

Step 104: pushing the document modification content to an associated document corresponding to the associated document identification.

In an implementation, pushing the document modification content to the associated document corresponding to the associated document identification may include: pushing the document modification content to the associated document corresponding to the associated document identification by message notification, so that the associated document is informed of the document modification content, and performs a document citation operation according to the document modification content.

Specifically, after extracting the associated document identification from the document relationship diagram according to the document identification, in order to ensure that a cross-document relationship can be maintained in both directions and to ensure consistency of the citation relationship, the document modification content of the cited party needs to be pushed to the citing party, that is, the associated document corresponding to the associated document identification. For example, the cited party is document C, and the associated document identifications that cite document C directly or indirectly are document A and document B. In the following, pushing document A is taken as an example for illustration. Document C includes a variable x, and x=9 before the document modification instruction is received. Document A cites x=9 of document C, and performs operations according to x=9. For example, document A includes a formula y=x+1, and since document A cites document C, y=9+1=10 in document A. However, when document C receives the document modification instruction "modify a variable value x=9 of document C to x=20", the variable value of document C is updated to x=20. To ensure the consistency of the citation relationship, the document modification content of document C needs to be pushed to document A by means of message notification. For example, the message notification is that "the variable value x=9 of document C has been modified to x=20". At this time, when document A receives the message notification and performs the document citation operation, y=x+1=20+1=21 in document A. The document modification content is pushed to document B in much the same way as document A, which will not be repeated in this implementation.

In the embodiment of the present disclosure, by acquiring the document relationship diagram of the database and the document modification instruction, extracting the associated document identification from the document relationship diagram according to the document identification included in the document modification instruction, and pushing the document modification content included in the document modification instruction to the associated document corresponding to the associated document identification, when a content of a document is edited and updated, a citation document associated with the edited document can also be updated synchronously, thereby ensuring consistency of the document update content in the database.

Embodiment 2

Figure 2A:
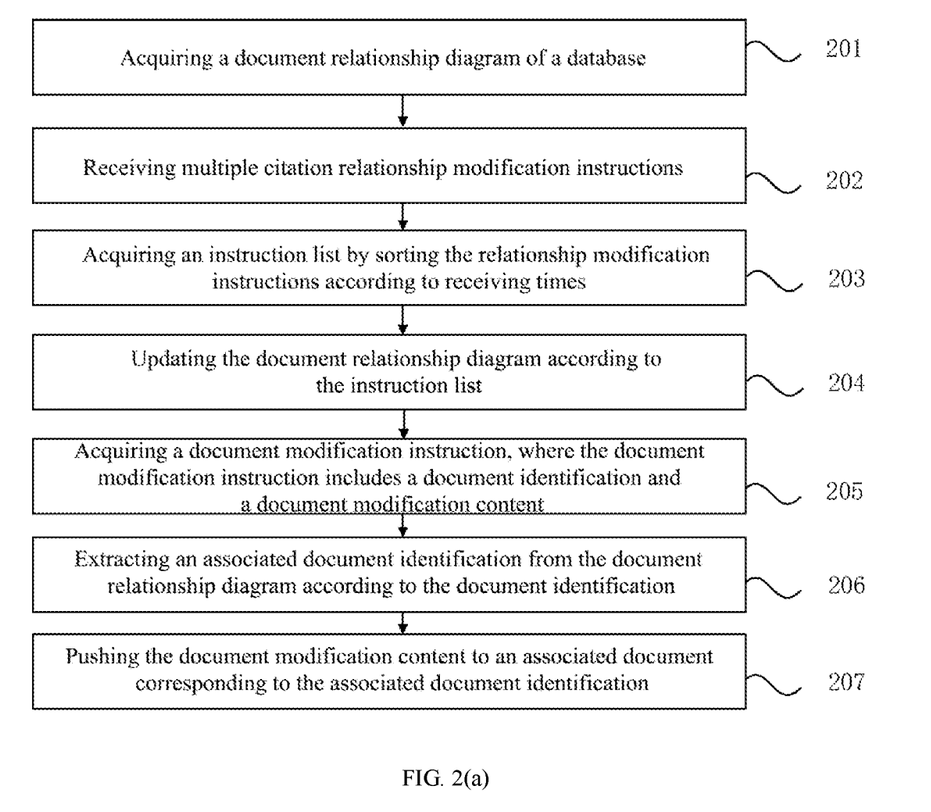
FIG. 2(a) is a flowchart of an updating method of a citation document provided in Embodiment 2 of the present disclosure.

FIG. 2(a) is a flowchart of an updating method of a citation document provided in Embodiment 2 of the present disclosure. The embodiment of the present disclosure can be combined with each optional solution in the above embodiment. In the embodiment of the present disclosure, after acquiring a document relationship diagram of a database, the following is further included: receiving multiple citation relationship modification instructions, and updating the document relationship diagram according to the multiple citation relationship modification instructions.

As shown in FIG. 2(a), the method of the embodiment of the present disclosure specifically includes the following steps.

Step 201, acquiring a document relationship diagram of a database.

The document relationship diagram includes nodes and a connection line, each node represents a document identification, and each connection line represents a document citation relationship.

As shown in FIG. 1(b), which is a schematic diagram of a document relationship diagram of a database, the document relationship diagram is a directed acyclic diagram and includes three nodes, namely document A, document B and document C, and document A, document B and document C are connected sequentially. Therefore, document A cites document B directly, document B cites document C directly, and thus document A cites document C indirectly.

Step 202, receiving multiple citation relationship modification instructions.

Specifically, for the document relationship diagram of the database shown in FIG. 1(b), different users may modify the citation relationship respectively, but an addition or a modification of any relationship is atomic. Atomicity means that multiple database operations that make up a transaction are an indivisible atomic unit. Only when all operations are executed successfully, the entire transaction is committed. If any database operation in the transaction fails, any operation that has been executed must be undone to return the database to its initial state.

For the document relationship diagram of the database shown in FIG. 1(b), multiple citation relationship modification instructions may be received, such as "cancel a citation relationship between document B and document C", "add a citation relationship between document B and document F". Of course, this implementation is only an example for illustration, and does not limit the specific number of the citation relationship modification instructions and the specific content of the citation relationship modification instructions.

Step 203, acquiring an instruction list by sorting the relationship modification instructions according to receiving times.

It should be noted that the instruction list is acquired by sorting the relationship modification instructions according to a sequential order of the receiving times. For example, a receiving time of a first relationship modification instruction "cancel a citation relationship between document B and document C" is 08:33:24, and a receiving time of a second relationship modification instruction "add a citation relationship between document B and document F" is 13:26:45, then an acquisition time of the first relationship modification instruction is earlier than an acquisition time of the second relationship modification instruction. Therefore, the instruction list acquired by sorting is shown in Table 2 below:

TABLE 2

| Serial number | Relationship modification instruction | Time |
| --- | --- | --- |
| 1 | Cancel a citation relationship between document B and document C | 08:33:24 |
| 2 | Add a citation relationship between document B and document F | 13:26:45 |

Step 204, updating the document relationship diagram according to the instruction list.

In an implementation, updating the document relationship diagram according to the instruction list may include: upon determining that the modification instructions include canceling a citation relationship between specified document identifications, determining the specified document identifications from the document relationship diagram, and deleting an connection line between the specified document identifications; and upon determining that the modification instructions include adding a new citation relationship, acquiring a newly added document identification and a historical document identification from the modification instructions, adding the newly added document identification to the document relationship diagram, and adding an connection line between the newly added document identification and the historical document identification, where the historical document identification is a node included in the document relationship diagram before the modification instructions are received.

Figure 2B:
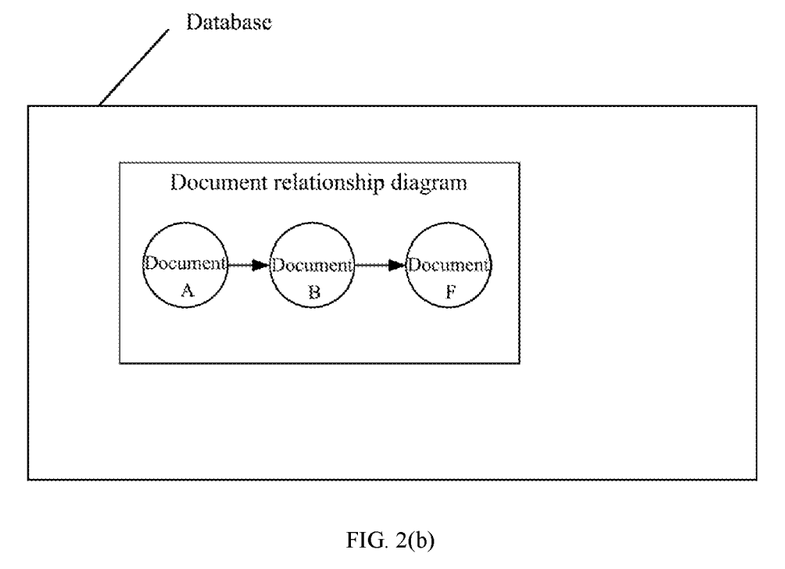
FIG. 2(b) is a schematic diagram of an updated document relationship diagram of a database provided in Embodiment 2 of the present disclosure.

Specifically, in this implementation, after acquiring the instruction list, the document relationship diagram is updated in a sequential order of instructions included in the instruction list. For example, the instruction "cancel a citation relationship between document B and document C" with the serial number 1 in the instruction list is executed first, that is, an connection line between document B and document C in the document relationship diagram of the database shown in FIG. 1(b) is deleted. Then the instruction "add a citation relationship between document B and document F" with the serial number 2 in the instruction list is executed. A newly added document identification, namely "document F", and a historical document identification "document B" are acquired from the modification instruction. Document F is added in the document relationship diagram, and a connection line between document F and document B is added. A schematic diagram of an updated document relationship diagram of the database is as shown in FIG. 2(b).

Step 205, acquiring a document modification instruction, where the document modification instruction includes a document identification and a document modification content.

In an implementation, the document modification content includes a change of a variable value or a change of a formula.

Step 206, extracting an associated document identification from the document relationship diagram according to the document identification.

In an implementation, extracting the associated document identification from the document relationship diagram according to the document identification may include: extracting a citation party list from the document relationship diagram according to the document identification; and acquiring the associated document identification having a citation relationship with the document identification from the citation party list.

In an implementation, extracting the citation party list from the document relationship diagram according to the document identification includes: acquiring a first type of document identification citing the document identification directly and a second type of document identification citing the document identification indirectly from the document relationship diagram; and constructing the citation party list according to the first type of document identification and the second type of document identification.

Step 207: pushing the document modification content to an associated document corresponding to the associated document identification.

In an implementation, pushing the document modification content to the associated document corresponding to the associated document identification may include: pushing the document modification content to the associated document corresponding to the associated document identification by message notification, so that the associated document is informed of the document modification content, and performs a document citation operation according to the document modification content.

In the embodiment of the present disclosure, by acquiring the document relationship diagram of the database and the document modification instruction, extracting the associated document identification from the document relationship diagram according to the document identification included in the document modification instruction, and pushing the document modification content included in the document modification instruction to the associated document corresponding to the associated document identification, when a content of a document is edited and updated, a citation document associated with the edited document can also be updated synchronously, thereby ensuring consistency of the document update content in the database.

Embodiment 3

Figure 3:
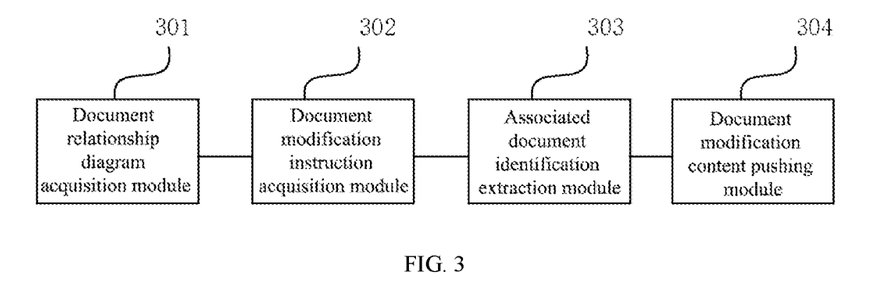
FIG. 3 is a schematic structural diagram of an updating apparatus of a citation document provided in Embodiment 3 of the present disclosure.

FIG. 3 is a schematic structural diagram of an updating apparatus of a citation document provided in Embodiment 3 of the present disclosure. The apparatus may be implemented in software and/or hardware, and may generally be integrated in an electronic device executing a method. As shown in FIG. 3, the apparatus may include: a document relationship diagram acquisition module, configured to acquire a document relationship diagram of a database, where the document relationship diagram includes nodes and a connection line, each node represents a document identification, and each connection line represents a document citation relationship;

a document modification instruction acquisition module, configured to acquire a document modification instruction, where the document modification instruction includes a document identification and a document modification content;

an associated document identification extraction module, configured to extract an associated document identification from the document relationship diagram according to the document identification; and a document modification content pushing module, configured to push the document modification content to an associated document corresponding to the associated document identification.

In the embodiment of the present disclosure, by acquiring the document relationship diagram of the database and the document modification instruction, extracting the associated document identification from the document relationship diagram according to the document identification included in the document modification instruction, and pushing the document modification content included in the document modification instruction to the associated document corresponding to the associated document identification, when a content of a document is edited and updated, a citation document associated with the edited document can also be updated synchronously, thereby ensuring consistency of the document update content in the database.

In an implementation, on the basis of the above technical solution, the associated document identification extraction module includes:

a citation party list extraction module, configured to extract a citation party list from the document relationship diagram according to the document identification;

an associated document identification acquisition module, configured to acquire the associated document identification having a citation relationship with the document identification from the citation party list.

In an implementation, on the basis of the above technical solution, the citation party list extraction module is specifically configured to:

acquire a first type of document identification citing the document identification directly and a second type of document identification citing the document identification indirectly from the document relationship diagram; and construct the citation party list according to the first type of document identification and the second type of document identification.

In an implementation, on the basis of the above technical solutions, the document modification content pushing module is specifically configured to:

push the document modification content to the associated document corresponding to the associated document identification by message notification, so that the associated document is informed of the document modification content, and performs a document citation operation according to the document modification content.

In an implementation, on the basis of the above technical solutions, the apparatus further includes:

a citation relationship modification instruction receiving module, configured to receive multiple citation relationship modification instructions;

an instruction list acquisition module, configured to acquire an instruction list by sorting the relationship modification instructions according to receiving times;

a document relationship diagram updating module, configured to update the document relationship diagram according to the instruction list.

In an implementation, on the basis of the above technical solutions, the document relationship diagram updating module is specifically configured to:

upon determining that the modification instructions include canceling a citation relationship between specified document identifications, determine the specified document identifications from the document relationship diagram, and delete an connection line between the specified document identifications; and upon determining that the modification instructions include adding a new citation relationship, acquire a newly added document identification and a historical document identification from the modification instruction, add the newly added document identification to the document relationship diagram, and add an connection line between the newly added document identification and the historical document identification, where the historical document identification is a node included in the document relationship diagram before the modification instructions are received.

In an implementation, on the basis of the above technical solutions, the document modification content includes a change of a variable value or a change of a formula.

The updating apparatus of a citation document provided by the embodiment of the present disclosure belongs to a same inventive concept as the updating method of a citation document provided by the above embodiments. For technical details not described in detail in the embodiment of the present disclosure, please refer to the above embodiments. The embodiment of the present disclosure has same beneficial effects as the above embodiments.

Embodiment 4

Figure 4:
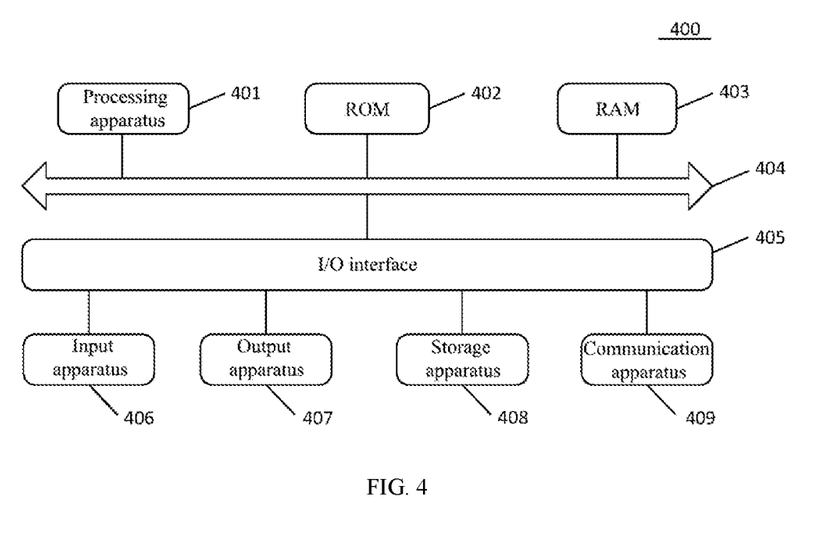
FIG. 4 is a schematic structural diagram of an electronic device provided in Embodiment 4 of the present disclosure.

Referring to FIG. 4 now, FIG. 4 shows a schematic structural diagram of an electronic device 400 suitable for implementing embodiments of the present disclosure. The electronic device in the embodiment of the present disclosure may be a device corresponding to a back-end service platform of an application, or a mobile terminal device with an application client installed. Specifically, the electronic device may include, but is not limited to, a mobile terminal such as a mobile phone, a laptop, a digital broadcast receiver, a PDA (Personal Digital Assistant), a PAD (portable android device), a PMP (Portable Multimedia Player), an in-vehicle terminal (for example, in-vehicle navigation terminal) and so on, and a fixed terminal such as a digital TV (Television, TV), a desktop computer and so on. The electronic device shown in FIG. 4 is only an example and should not impose any restriction on the functions and scope of use of the embodiments of the present disclosure.

As shown in FIG. 4, the electronic device 400 may include a processing apparatus (for example, a central processing unit, a graphics processor, etc.) 401, which may execute various appropriate actions and processing according to a program stored in a read-only memory (ROM) 402 or a program loaded from a storage apparatus 408 into a random access memory (RAM) 403. Various programs and data required for operations of the electronic device 400 are also stored in the RAM 403. The processing apparatus 401, the ROM 402 and the RAM 403 are connected to each other through a bus 404. An input/output (I/O) interface 405 is also connected to the bus 404.

Generally, the following apparatuses may be connected to the I/O interface 405: an input apparatus 406 including, for example, a touch screen, a touch pad, a keyboard, a mouse, a camera, a microphone, an accelerometer, a gyroscope, etc.; an output apparatus 407 including, for example, a liquid crystal display (LCD), a speaker, a vibrator, etc.; the storage apparatus 408 including, for example, a magnetic tape, a hard disk, etc.; and a communication apparatus 409. The communication apparatus 409 may allow the electronic device 400 to communicate wirelessly or through wires with other devices to exchange data. Although FIG. 4 shows the electronic device 400 having various apparatuses, it should be understood that not all of the illustrated apparatuses are required to be implemented or provided. More or fewer apparatuses may alternatively be implemented or provided.

In particular, according to an embodiment of the present disclosure, processes described above with reference to flowcharts may be implemented as a computer software program. For example, an embodiment of the present disclosure includes a computer program product including a computer program carried on a non-transitory computer-readable medium, the computer program including program code for executing the methods illustrated in the flowcharts. In such an embodiment, the computer program may be downloaded and installed from a network through the communication apparatus 409, or installed from the storage apparatus 408, or installed from the ROM 402. When the computer program is executed by the processing apparatus 401, the above-mentioned functions defined in the methods of the embodiments of the present disclosure are executed.

It should be noted that the computer-readable medium of the present disclosure may be a computer-readable signal medium or a computer-readable storage medium, or a combination of the above two. The computer-readable storage medium may be, for example, but is not limited to, an electrical, magnetic, optical, electromagnetic, infrared or semiconductor system, apparatus or device, or any combination of the above. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash), an optical fiber, a portable compact disc read-only memory (CD-ROM), an optical storage device, a magnetic storage device, or any suitable combination of the above. In the present disclosure, the computer-readable storage medium may be any tangible medium containing or storing a program, and the program may be used by, or used in combination with, an instruction execution system, apparatus or device. In the present disclosure, the computer-readable signal medium may include a data signal propagated in a baseband or as a part of a carrier wave, in which computer-readable program code is carried. Such propagated data signal may take a variety of forms, including but not limited to an electromagnetic signal, an optical signal or a suitable combination of the above. The computer-readable signal medium may also be any computer-readable medium other than the computer-readable storage medium, and the computer-readable signal medium may send, propagate or transmit a program for use by, or use in combination with, an instruction execution system, apparatus or device. The program code contained on the computer-readable medium may be transmitted with any suitable medium, including but not limited to: a wire, an optical cable, RF (Radio Frequency, radio frequency) or the like, or any suitable combination of the above.

In some implementations, a client and a server may communicate using any currently known or future developed network protocol such as HTTP (Hyper Text Transfer Protocol), and may interconnect with any form or medium of digital data communication (for example, a communication network). Examples of the communication network include a local area network (LAN), a wide area network (WAN), an internet (for example, the Internet), and an end-to-end network (for example, an ad hoc end-to-end network), and any currently known or future developed network.

The computer-readable medium may be included in the electronic device; or may also exist alone without being assembled into the electronic device.

The computer-readable medium carries one or more programs. When the one or more programs are executed by the electronic device, the electronic device is caused to: acquire a document relationship diagram of a database, where the document relationship diagram includes nodes and a connection line, each node represents a document identification, and each connection line represents a document citation relationship; acquire a document modification instruction, where the document modification instruction includes a document identification and a document modification content; extract an associated document identification from the document relationship diagram according to the document identification; and push the document modification content to an associated document corresponding to the associated document identification.

Computer program code for performing operations of the present disclosure may be written in one or more programming languages or combinations thereof. The programming languages include, but are not limited to: object-oriented programming languages such as Java, Smalltalk, C++, and also include conventional procedural programming languages such as "C" language or similar programming languages. The program code may be executed completely on a user computer, executed partially on a user computer, executed as an independent software package, executed partially on a user computer and partially on a remote computer, or executed completely on a remote computer or a server. In a case involving the remote computer, the remote computer may be connected to the user computer through any kind of network, including a local area network (LAN)

or a wide area network (WAN), or may be connected to an external computer (for example, connected through the Internet using an Internet service provider).

The flowcharts and block diagrams in the accompanying drawings illustrate architectures, functions and operations of possible implementations of systems, methods and computer program products according to various embodiments of the present disclosure. In this regard, each block in the flowcharts or block diagrams may represent a module, a program segment, or a part of code that contains one or more executable instructions for implementing a specified logical function. It should also be noted that in some alternative implementations, the functions marked in the blocks may also occur in a different order than those marked in the drawings. For example, two blocks represented successively may actually be executed basically in parallel, or may sometimes be executed in an opposite order, depending on the function involved. It should also be noted that each block in the block diagrams and/or flowcharts and the combination of blocks in the block diagrams and/or flowcharts may be implemented by a dedicated hardware-based system performing specified functions or operations, or by a combination of dedicated hardware and computer instructions.

The units described in the embodiments of the present disclosure may be implemented in software, and may also be implemented in hardware. In some cases, names of the units do not limit the modules per se.

The functions described above herein may be performed at least in part by one or more hardware logic components. For example, without limitation, exemplary types of the hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that may contain or store a program for use by, or use in combination with, an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the above. More specific examples of the machine-readable storage medium would include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

According to one or more embodiments of the present disclosure, Example 1 provides an updating method of a citation document, including:
  acquiring a document relationship diagram of a database, where the document relationship diagram includes nodes and a connection line, each node represents a document identification, and each connection line represents a document citation relationship;
  acquiring a document modification instruction, where the document modification instruction includes a document identification and a document modification content;
  extracting an associated document identification from the document relationship diagram according to the document identification; and
  pushing the document modification content to an associated document corresponding to the associated document identification.

According to one or more embodiments of the present disclosure, Example 2 provides the method of Example 1, where extracting the associated document identification from the document relationship diagram according to the document identification includes:
  extracting a citation party list from the document relationship diagram according to the document identification; and
  acquiring the associated document identification having a citation relationship with the document identification from the citation party list.

According to one or more embodiments of the present disclosure, Example 3 provides the method of Example 2, where extracting the citation party list from the document relationship diagram according to the document identification includes:
  acquiring a first type of document identification citing the document identification directly and a second type of document identification citing the document identification indirectly from the document relationship diagram; and
  constructing the citation party list according to the first type of document identification and the second type of document identification.

According to one or more embodiments of the present disclosure, Example 4 provides the method of Example 1, where pushing the document modification content to the associated document corresponding to the associated document identification includes:
  pushing the document modification content to the associated document corresponding to the associated document identification by message notification, so that the associated document is informed of the document modification content, and performs a document citation operation according to the document modification content.

According to one or more embodiments of the present disclosure, Example 5 provides the method of Example 1 which, after acquiring the document relationship diagram, further includes:
  receiving multiple citation relationship modification instructions;
  acquiring an instruction list by sorting the citation relationship modification instructions according to receiving times; and
  updating the document relationship diagram according to the instruction list.

According to one or more embodiments of the present disclosure, Example 6 provides a method of Example 5, where updating the document relationship diagram according to the instruction list includes:
  upon determining that the citation relationship modification instructions include canceling a citation relationship between specified document identifications, determining the specified document identifications from the document relationship diagram, and deleting an connection line between the specified document identifications; and
  upon determining that the citation relationship modification instructions include adding a new citation relationship, acquiring a newly added document identification and a historical document identification from the citation relationship modification instructions, adding the newly added document identification to the document relationship diagram, and adding an connection line between the newly added document identification and the historical document identification, where the historical document identification is represented as a node included in the document relationship diagram before the citation relationship modification instructions are received.

According to one or more embodiments of the present disclosure, Example 7 provides the method according to any one of Examples 1-6, where the document modification content includes a change of a variable value or a change of a formula.

According to one or more embodiments of the present disclosure, Example 8 provides an updating apparatus of a citation document, including:
- a document relationship diagram acquisition module, configured to acquire a document relationship diagram of a database, where the document relationship diagram includes nodes and a connection line, each node represents a document identification, and each connection line represents a document citation relationship;
- a document modification instruction acquisition module, configured to acquire a document modification instruction, where the document modification instruction includes a document identification and a document modification content;
- an associated document identification extraction module, configured to extract an associated document identification from the document relationship diagram according to the document identification; and
- a document modification content pushing module, configured to push the document modification content to an associated document corresponding to the associated document identification.

According to one or more embodiments of the present disclosure, Example 9 provides an electronic device, including a memory, a processing apparatus, and a computer program stored on the memory and runnable on the processing apparatus, where the processing apparatus implements the method according to any one of Examples 1-7 when executing the program.

According to one or more embodiments of the present disclosure, Example 10 provides a storage medium including computer executable instructions, where the computer executable instructions execute the method according to any one of Examples 1-7 when executed by a computer processor.

According to one or more embodiments of the present disclosure, Example 11 provides a computer program product including a computer program, where steps of the method according to any embodiment of the present disclosure are implemented when the computer program is executed by a processing apparatus.

According to one or more embodiments of the present disclosure, Example 12 provides a computer program, where steps of the method according to any embodiment of the present disclosure are implemented when the computer program is executed by a processing apparatus.

The above description is only preferred embodiments of the present disclosure and an illustration of technical principles employed. Those skilled in the art should understand that the disclosure scope involved in the present disclosure is not limited to the technical solutions formed by the specific combination of the above technical features, but also covers other technical solutions formed by arbitrary combination of the above technical features or their equivalent features without departing from the above disclosed concept, for example, technical solutions formed by substituting the above features and (but not limited to) the technical features with similar functions as disclosed in the present disclosure for one another.

In addition, although operations are described in a specific order, this should not be understood as requiring the operations to be performed in the specific order shown or in a sequential order. Under certain circumstances, multitasking and parallel processing may be advantageous. Similarly, although several specific implementation details are contained in the above description, these should not be interpreted as limitations to the scope of the present disclosure. Certain features described in the context of separate embodiments may also be implemented in combination in a single embodiment. Conversely, various features described in the context of a single embodiment may also be implemented in multiple embodiments separately or in any suitable subcombinations.

Although the present subject matter has been described in a language specific to structural features and/or logical actions of methods, it should be understood that the subject matter defined in appended claims is not necessarily limited to the specific features or actions described above. On the contrary, the specific features and actions described above are only exemplary forms for implementing the claims.

The invention claimed is:

1. An updating method of a citation document, applied to an electronic device, comprising:
   acquiring a document relationship diagram;
   acquiring a document modification instruction, wherein the document modification instruction comprises a document identification and a document modification content;
   extracting an associated document identification from the document relationship diagram according to the document identification; and
   sending the document modification content to an associated document corresponding to the associated document identification, so that the associated document is informed of the document modification content, and updates the associated document according to the document modification content,
   wherein extracting the associated document identification from the document relationship diagram according to the document identification comprises:
      acquiring the associated document identification having a citation relationship with the document identification from the document relationship diagram according to the document identification;
   wherein sending the document modification content to the associated document corresponding to the associated document identification, so that the associated document is informed of the document modification content, and updates the associated document according to the document modification content comprises:
      sending the document modification content to the associated document corresponding to the associated document identification by message notification, so that the associated document is informed of the document modification content, and performs a document citation operation according to the document modification content.

2. The method according to claim 1, wherein acquiring the associated document identification having the citation relationship with the document identification from the document relationship diagram according to the document identification comprises:

acquiring a first type of document identification citing the document identification directly and a second type of document identification citing the document identification indirectly from the document relationship diagram.

3. The method according to claim 1, after acquiring the document relationship diagram, further comprising:
receiving multiple citation relationship modification instructions;
acquiring an instruction list by sorting the citation relationship modification instructions according to receiving times; and
updating the document relationship diagram according to the instruction list.

4. The method according to claim 3, wherein updating the document relationship diagram according to the instruction list comprises:
upon determining that the citation relationship modification instructions comprise canceling a citation relationship between specified document identifications, determining the specified document identifications from the document relationship diagram, and deleting an association relationship between the specified document identifications; and
upon determining that the citation relationship modification instructions comprise adding a new citation relationship, acquiring a newly added document identification and a historical document identification from the citation relationship modification instructions, adding the newly added document identification to the document relationship diagram, and adding an association relationship between the newly added document identification and the historical document identification, wherein the historical document identification is represented as a node comprised in the document relationship diagram before the citation relationship modification instructions are received.

5. The method according to claim 1, wherein the document modification content comprises a change of a variable value or a change of a formula.

6. The method according to claim 5, wherein the change of the variable value comprises a modification of the variable value in the citation document.

7. An updating apparatus of a citation document, applied to an electronic device, comprising:
one or more processors;
a storage apparatus, configured to store one or more programs, and the one or more processors are configured to:
acquire a document relationship diagram;
acquire a document modification instruction, wherein the document modification instruction comprises a document identification and a document modification content;
extract an associated document identification from the document relationship diagram according to the document identification; and
send the document modification content to an associated document corresponding to the associated document identification, so that the associated document is informed of the document modification content, and updates the associated document according to the document modification content,
wherein the one or more processors are configured to:
acquire the associated document identification having a citation relationship with the document identification from the document relationship diagram according to the document identification;
wherein the one or more processors are further configured to:
send the document modification content to the associated document corresponding to the associated document identification by message notification, so that the associated document is informed of the document modification content, and performs a document citation operation according to the document modification content.

8. The updating apparatus according to claim 7, wherein the one or more processors are further configured to:
acquire a first type of document identification citing the document identification directly and a second type of document identification citing the document identification indirectly from the document relationship diagram.

9. The updating apparatus according to claim 7, the one or more processors are further configured to:
receive multiple citation relationship modification instructions;
acquire an instruction list by sorting the citation relationship modification instructions according to receiving times; and
update the document relationship diagram according to the instruction list.

10. The updating apparatus according to claim 9, wherein the one or more processors are further configured to:
upon determining that the citation relationship modification instructions comprise canceling a citation relationship between specified document identifications, determine the specified document identifications from the document relationship diagram, and delete an association relationship between the specified document identifications; and
upon determining that the citation relationship modification instructions comprise adding a new citation relationship, acquire a newly added document identification and a historical document identification from the citation relationship modification instructions, add the newly added document identification to the document relationship diagram, and add an association relationship between the newly added document identification and the historical document identification, wherein the historical document identification is represented as a node comprised in the document relationship diagram before the citation relationship modification instructions are received.

11. The updating apparatus according to claim 7, wherein the document modification content comprises a change of a variable value or a change of a formula.

12. The updating apparatus according to claim 11, wherein the change of the variable value comprises a modification of the variable value in the citation document.

13. A non-transitory computer-readable storage medium having a computer program stored thereon, wherein when the program is executed by a processor, the following operations are implemented:
acquiring a document relationship diagram;
acquiring a document modification instruction, wherein the document modification instruction comprises a document identification and a document modification content;
extracting an associated document identification from the document relationship diagram according to the document identification; and
sending the document modification content to an associated document corresponding to the associated document identification, so that the associated document is informed of the document modification content, and updates the associated document according to the document modification content, wherein extracting the associated document identification from the document relationship diagram according to the document identification comprises:
 acquiring the associated document identification having a citation relationship with the document identification from the document relationship diagram according to the document identification;

wherein sending the document modification content to the associated document corresponding to the associated document identification, so that the associated document is informed of the document modification content, and updates the associated document according to the document modification content comprises:
 sending the document modification content to the associated document corresponding to the associated document identification by message notification, so that the associated document is informed of the document modification content, and performs a document citation operation according to the document modification content.

14. The storage medium according to claim 13, wherein acquiring the associated document identification having the citation relationship with the document identification from the document relationship diagram according to the document identification comprises:
 acquiring a first type of document identification citing the document identification directly and a second type of document identification citing the document identification indirectly from the document relationship diagram.

* * * * *